United States Patent
Feller et al.

[11] Patent Number: 5,993,311
[45] Date of Patent: Nov. 30, 1999

[54] CLEAN ROOM CEILING STRUCTURE

[75] Inventors: Eugen Feller, Grafenau; Manfred Renz, Ditzingen, both of Germany

[73] Assignee: Meissner & Wurst GmbH Co., Germany

[21] Appl. No.: 08/943,550

[22] Filed: Oct. 3, 1997

[30] Foreign Application Priority Data

Oct. 5, 1996 [DE] Germany .......................... 196 41 127

[51] Int. Cl.⁶ .................................................. B01L 1/04
[52] U.S. Cl. .............................................. 454/187; 55/355
[58] Field of Search .............................. 454/187; 55/355, 55/484, 385.2

[56] References Cited

U.S. PATENT DOCUMENTS

| | | | |
|---|---|---|---|
| 3,486,311 | 12/1969 | Allan | 55/355 |
| 4,507,203 | 3/1985 | Johnston | 210/445 |
| 4,511,380 | 4/1985 | Fetter | 55/355 |
| 4,580,381 | 4/1986 | Sodec et al. | 52/475 |
| 4,671,811 | 6/1987 | Cadwell, Jr. et al. | 55/355 |
| 4,710,208 | 12/1987 | Ziemer et al. | 55/355 |
| 4,846,859 | 7/1989 | Nobiraki et al. | 55/276 |
| 4,854,098 | 8/1989 | Emmer | 52/398 |
| 4,946,484 | 8/1990 | Monson et al. | 55/385.2 |
| 4,986,050 | 1/1991 | Brunetti et al. | 52/488 |
| 5,192,348 | 3/1993 | Ludwig | 55/385.2 |
| 5,279,632 | 1/1994 | Decker et al. | 55/355 |
| 5,540,028 | 7/1996 | Scott et al. | 52/506.8 |
| 5,620,369 | 4/1997 | Spransy et al. | 454/187 |

*Primary Examiner*—Harold Joyce
*Assistant Examiner*—Derek S. Boles
*Attorney, Agent, or Firm*—Robert W. Becker & Associates

[57] ABSTRACT

A clean room ceiling structure includes a support structure and filter units with a filter frame and a filter secured in the filter frame. The filter frames are connected to the support structure. The filter units have sealing fluid grooves for sealing the filter units relative to the support structure.

42 Claims, 8 Drawing Sheets

CLEAN ROOM CEILING STRUCTURE

BACKGROUND OF THE INVENTION

The present invention relates to a clean room ceiling structure, preferably a modular ceiling structure, comprising a support structure having arranged thereat filter units comprised of filters and filter frames which are supported at holders of the support structure and are sealed relative to the support structure by at least one fluid groove.

Known-modular ceiling structures of this kind are comprised of rails and connecting elements or coupling members. The rails have connected thereto the filter/fan units. For sealing the filter units relative to the support structure, the rails are provided with fluid grooves into which extends a sealing stay of the filter frame. This embodiment has the disadvantage that the width of the rails is relatively large which, in turn, results in the effective filter surface area being reduced. Furthermore, due to the large width stronger turbulence may occur within the clean room. In order to reduce turbulence locally, it is therefore suggested to provide perforated sheet metal plates below the filter units and arrange them such that they are flush with the ceiling structure. Illumination for the modular ceiling structure is integrated into the rail of these known modular ceiling structures. This also results in the width of the rails being large so that the effective filter surface area is reduced.

Other modular ceiling structures are known in which the illumination or lamps are provided within the clean room at the support structure of the ceiling, i.e., the lamps are suspended from the ceiling structure. This reduces the usable height of the clean room.

It is therefore an object of the present invention to provide a clean room ceiling structure of the aforementioned kind such that a widened embodiment of the support structure, caused by the fluid groove and by an optionally provided lamp, is prevented.

SUMMARY OF THE INVENTION

A clean room ceiling structure according to the present invention is primarily characterized by:

A support structure;

Filter units comprising a filter frame and a filter secured in the filter frame;

The filter frames connected to the support structure;

The filter units comprising at least one fluid groove for sealing the filter units relative to the support structure.

Advantageously, the support structure has at least one sealing stay extending into the at least one fluid groove.

Preferably, the at least one fluid groove is provided at the filter frame.

Advantageously, the filter frame has a fastening stay on a side facing away from the filter for securing the filter unit at the support structure.

Advantageously, the fluid groove is positioned on a side of the filter frame facing the filter.

The support structure expediently comprises holders and rails, wherein the rails have outer receiving members at an underside of the rails and wherein the holders are attached to the outer receiving members.

The sealing stays are connected to the rails and are positioned adjacent to the outer receiving members, wherein the outer receiving members have a lateral opening.

The holders are preferably suspended from the outer receiving members.

The lateral opening of the outer receiving members opens toward the sealing stays and the holders have a securing stay inserted into the lateral opening.

Advantageously, the rails have a center receiving member arranged between the outer receiving member and having a downwardly open insertion slot.

The rails are hollow members having a rectangular cross-section and the outer and central receiving members are connected to the bottom of the hollow members.

The hollow member has preferably a top wall opposite the bottom and includes an upper receiving member connected to the top wall so as to be mirror-symmetrically arranged relative to the longitudinal center plane of the hollow member.

Preferably, the filter frame comprises a receiving opening for the filter.

The filter frame has preferably a fastening stay on a side facing away from the filter and the stay rests on the holder.

Advantageously, the outer receiving member have a wall section adjacent to the lateral opening and the securing stay engages behind the wall section.

The holders have a clamping element remote from the securing stay, wherein the clamping element has spring legs.

Advantageously, the clean room ceiling structure further comprises at least one closure plate positioned between facing sides of the filter frames.

The closure plate has securing projections with widened ends that are inserted into the clamping elements for attaching the closure plate to the holders.

The closure plate is comprised of two parts, wherein between adjacent ones of the filter frames a wall member is positioned and wherein the two parts abut the wall member.

Expediently, the wall member has fastening elements in the form of hollow members connected to one another and the wall member is connected by the fastening elements to one of the rails.

Advantageously, a first one of the fastening elements is directly fastened to the rail. Advantageously, a second one of the fastening elements comprises a snap-on fastener for connecting the second fastening element to the first fastening element.

The clean room ceiling structure may further comprise a lamp, wherein adjacent ones of the holders and the closure plate define a chamber and the lamp is positioned in the chamber. Preferably, the lamp is connected to the rail.

Preferably, one of the filter frames is a false frame element.

The false frame element comprises a wall section and a Z-shaped member forming one of the fluid grooves, wherein the Z-shaped member is connected to the wall section by welding.

The false frame element further comprises a rail member connected to the wall section by welding, wherein the closure plate has an edge resting at the rail member.

Preferably, the clean room ceiling structure further comprises a support member for carrying a load, wherein the closure plate is comprised of two parts resting at opposed sides of the support member.

Preferably, the load is screwed to the support member.

Expediently, the support member is fastened to the rail by screwing.

The fluid groove is positioned inside a cross-sectional width of the filter frame.

The closure plate is positioned below the filter frame.

The closure plate in a preferred embodiment has air vent openings.

The closure plate may be attached to the holders.

The clean room ceiling structure may further comprise perforated plates connected at a spacing underneath the filter units, wherein the closure plate is positioned adjacent to the perforated plates.

The clean room ceiling structure may further comprise at least one sending-and-receiving unit positioned in a space between adjacent once of the filter frames.

The sending-and-receiving unit comprises at least one sending/receiving diode and/or a radio wave transmitting device.

The diode is preferably an IR diode.

The clean room ceiling structure may further comprise a signal-translucent cover for covering the diode.

The cover is connected to the closure plate.

Advantageously, the clean room ceiling structure further comprises at least one profiled member positioned in a space between two adjacent once of the filter frames.

The clean room ceiling structure may also comprise a sending-and-receiving unit received in one of the at least one profiled members.

The clean room ceiling structure may also comprise data and/or supply cables received in another one of the at least one profiled members.

According to the inventive embodiment, the fluid grooves are provided at the filter unit. Thus, they can be positioned, in the mounted position of the filter unit at the support structure, within the filter frame contour. Thus, a widened embodiment of the support structure is prevented. The effective filter surface area can even be enlarged due to the relatively minimal width of the support structure. Furthermore, due to the inventive embodiment it is now possible to provide the underside of the ceiling structure in a planar embodiment. For example, when the inventive clean room ceiling structure is to be provided with illumination, a suspended load, a wall fixation element etc., all these elements can be positioned between adjacently positioned filter units.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 13.

For manufacturing processes in the microelectronics industry, pharmaceutical industry, micro technology and optics industries, food industry, medical technology and laboratory technology etc., it is necessary to keep the air free of microorganisms and/or free of dust particles. For this purpose, so-called clean rooms are used. These clean rooms are provided with clean room ceiling structures in which filter units are provided for cleaning the air. The filter units are connected to a support structure suspended from the actual ceiling of the room. The support structure may be a modular structure comprised of support rails 1 and coupling members 2, 2a (FIGS. 6 through 11) which connect the rails 1 at the crossing points. The rails 1 and the coupling members 2, 2a are profiled members. The rails 1 are preferably of identical construction while the coupling members 2, 2a, in a manner known per se are cross-shaped, have a T-shape or L-shape and are provided with projections on which the ends of the rails 1 are positioned or at which the rails 1 abut when mounted. The projections, in general, have the same cross-section as the rails 1. With the aid of FIGS. 6 through 11, a T-shaped coupling member 2 and a cross-shaped coupling member 2a will be explained in more detail as exemplary embodiments of such coupling members.

As shown in FIGS. 1 through 5, filter units are connected to the rails 1. FIGS. 1 through 5 show only a portion of the filter 3, 3' with corresponding filter frame (support) 4, 4'. The filters 3, 3' project into lateral receiving members 5, 5' of the frame 4, 4'. They are in the form of profiled rails which are supported with their upper stay 6, 6' on shoulders or securing stays 7, 7' of a holder 8, 8' connected to the rail 1. On either longitudinal side of the rail a filter unit comprised of filter 3, 3' and corresponding frame 4, 4' is provided. The arrangement of the rails 1 and of the coupling members 2, 2a as well as of their filter/fan units connected thereto is known and conventional.

The coupling member 2 (FIGS. 6 through 10) comprises a through opening 9 at its bottom side which is used especially for introducing cables or for mounting so-called sprinkler systems. As is shown especially in FIGS. 7 and 8, the through opening 9 is centrally located at the coupling member 2. Coupling member 2 is designed for receiving three rails 1 which are connected to the lateral projections 10 through 12. The projections 10 through 12 have a shape that matches the profiled rail. The through opening 9 is delimited by a circumferential annular wall 13 which in the shown embodiment comprises four radially outwardly extending reinforcement ribs 14 through 17 that extend to the opposite wall sections 18 through 20. In the connecting area to the annular wall 13 the reinforcement ribs 14 through 17 have widened connecting portions 21 through 24 which preferably have a circular cross-section.

Figures 7, 8, 10, 11:
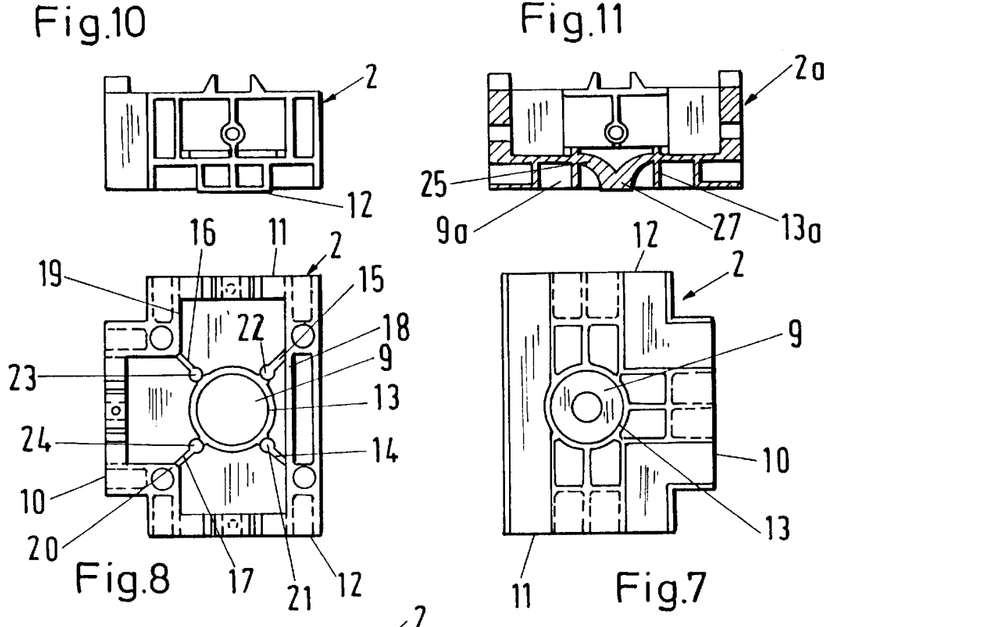
FIG. 7 shows the coupling member according to FIG. 6 in a view from below.
FIG. 8 shows the coupling member according to FIG. 6 in a plan view.
FIG. 10 shows the coupling member according to FIG. 6 in a view according to arrow X in FIG. 6.
FIG. 11 shows a cross-shaped coupling member in a representation corresponding to FIG. 9.
Figure 9:
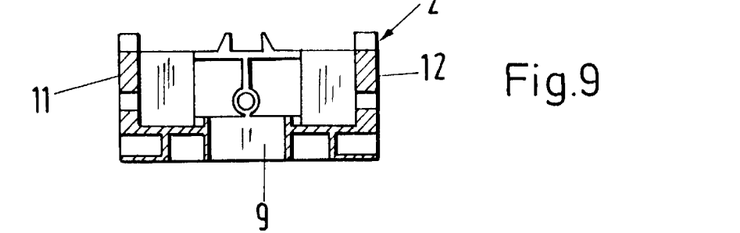
FIG. 9 shows the coupling member in a section along the line IX—IX of FIG. 6.

As is shown in FIG. 11 for the cross-shaped coupling member 2a, the through opening 9a can be closed off by a bottom portion. This bottom portion in cross-section has downwardly curved, circular segments 25, 26 tapering in a V-shape and ending in a common end piece 27 centrally arranged relative to the through opening 9a. The thickness of the bottom segments 25, 26 tapers away from the end piece 27 so that at the transition to the annular wall 13a the smallest thickness is provided. Thus, the bottom portion (25, 26, 27) can be easily broken off if needed. Such bottom portions can also be provided at the other coupling members.

The rail 1 is comprised of a rectangular hollow member 28. At half its width the hollow member 28 has a central stay 29 extending over the entire length of the rail 1, its lower half is provided with a tubular portion 31 spaced from the bottom 30 of the hollow member 28. In the mounted position of the support structure, the tubular portion 31 is aligned with corresponding tubular portions 32 through 34 of the coupling member 2 (FIG. 6) and serves for receiving a rod-shaped securing element. The tubular portion 31 is a unitary part of the stay 29. On the top wall of the hollow member 28 a receiving member 36 is provided which is arranged symmetrically to the stay 29. The receiving member 36 is delimited by two L-shaped stays 37 and 38 which are unitary parts of the top wall 35.

Figure 6:
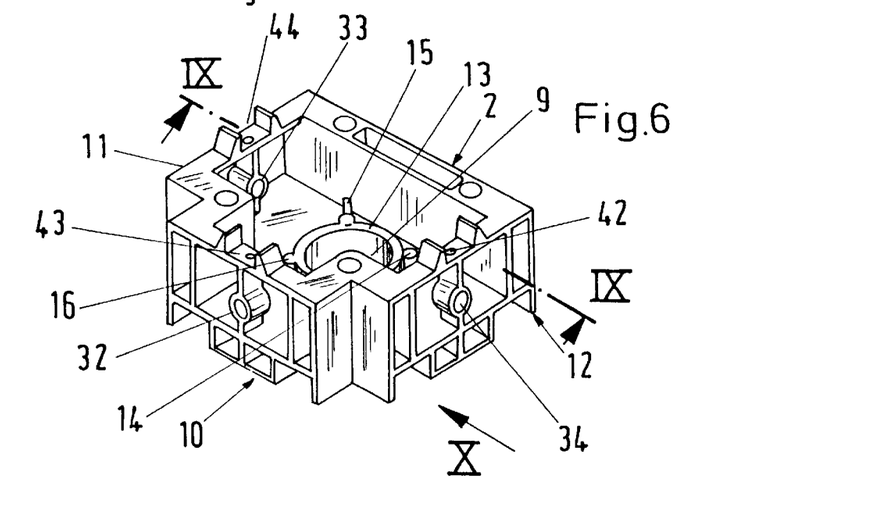
FIG. 6 shows a T-shaped coupling member of a ceiling support structure according to FIG. 1 in an enlarged perspective view.

The angled and facing legs 39 and 40 of the stays 37, 38 delimit a slot 41 which in the mounted position is aligned with a respective opening 42 through 44 of the coupling member 2, depending on the connecting position of the rail 1 at the coupling member.

Below the bottom 30 of the rail 1, a further receiving member 45 is provided which is of the same construction as the receiving member 36. The receiving members 36, 45 are arranged mirror-symmetrically to the longitudinal center plane 46 of the rail 1. The longitudinal side walls 47, 48 of the rail 1 are extended downwardly passed the bottom 30 to such an extent that their free edges 49, 50 are positioned at the same level as the facing legs 51, 52 of the receiving member 45. These legs 51, 52 delimit a through slot 53. Between the portions 54, 55 of the side walls 47, 48 projecting past the bottom 30 and the receiving member 45, further receiving members 56, 57 are respectively provided. They are positioned at a distance to the aforementioned portions 54, 55 and member 45. Both receiving members 56, 57 are of identical construction and are positioned mirror-symmetrically to the longitudinal center plane 46 of the rail 1. They have a rectangular contour and are provided at their side walls 58, 59 facing the projecting wall portions 54, 55 with a lateral slot or opening 60, 61 into which the securing stays 7, 7' of the holders 8, 8' of the support structure project. The receiving members 56, 57 have the same height as the centrally positioned receiving member 45 so that they do not project past the receiving member 45 and the portions 54, 55 of the walls 47, 48.

The filters 3 and 3' are secured in the frame-shaped filter supports 4, 4'. The filter supports or frames 4, 4' are identical so that in the following only one of the filter frames 4 will be described.

Figure 1:
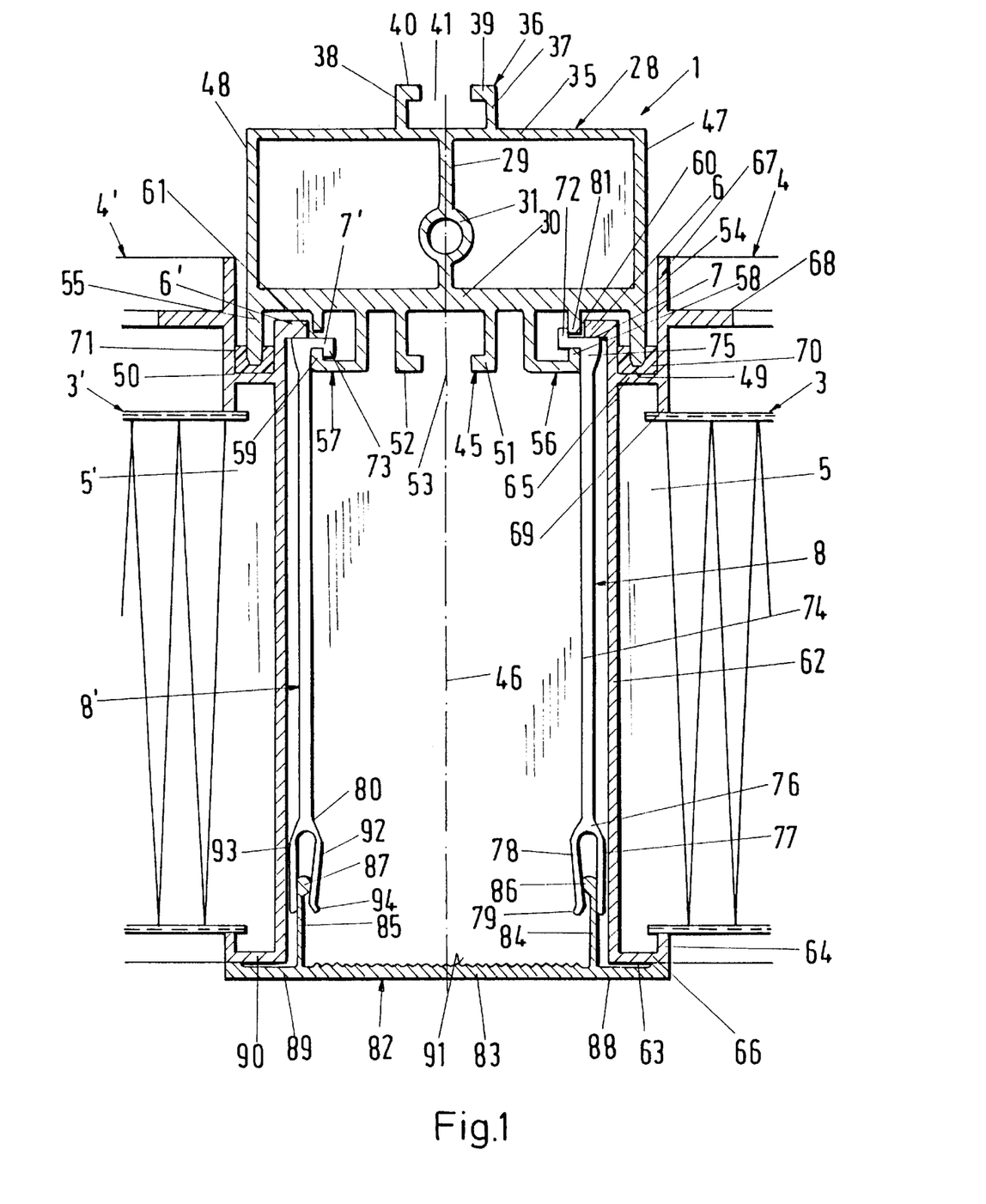
FIG. 1 shows a vertical section of the inventive clean room ceiling structure with a closure plate.

The filter frame 4 is a rectangular frame with a cross-section shown in FIG. 1. It comprises a planar wall 62 having a lower edge 63 that extends L-shaped inwardly in the direction toward the filter 3. The filter 3 rests on the upwardly extending end 64. The stay 6 at the upper end is angled in the opposite direction to the lower edge 63, i.e., outwardly and has a greater thickness than the wall 62 of the filter frame 4. The filter frame 4 rests with the angled stay 6 on the shoulder or securing stay 7 of the holder 8 in the mounted position of the filter unit.

A horizontal stay 65 projects from the wall 62 in the direction toward the filter 3 at a small distance below the upper stay 6 and extends parallel to the horizontal leg 66 of the lower edge 63. The width of this horizontal stay 65 is identical to the width of the leg 66. A vertical support wall 67 is positioned parallel to the wall 62 and is connected perpendicularly to the horizontal stay 65. It projects past stay 65 in the downward and upward directions. In the downward direction the support wall 67 projects only minimally past the stay 65, while in the upward direction it projects past the stay 65 and past the level of the bottom 30 of the rail 1. The support wall 67 is positioned at a small distance to the rail 1. In the area below the bottom 30 a further horizontal stay 68 projects from the support wall 67. It is slightly thicker than the stay 65. In the mounted position the filter 3 rests at the lower end face 69 of the support wall 67. Support wall 67 delimits with the stay 65 and the wall section of the wall 62 above stay 65 a fluid groove 70 which receives a sealing medium. A corresponding fluid groove 71 is also provided at the other filter frame 4'. Both fluid grooves 70, 71 receive the wall sections or sealing stays 54, 55 of the rail 1 that project in the downward direction past the bottom 30. These fluid grooves 70, 71 provide for a sealing action of the filter units relative to the support structure, especially its rail 1.

The holders 8, 8' are substantially mirror-symmetrically arranged to one another. They differ only in that the free end 72 of the shoulder 7 of the holder 8 projects at a right angle in the upward direction and the free end 73 of the shoulder 7' of the holder 8' projects at a right angle in the downward direction. Accordingly, only the holder 8 will be described in the following. In the mounted position it has a vertical leg 74. Its upper end 75 is slightly thicker and projects past the L-shaped shoulder (securing stay) 7. The lower end 76 of the holder 8 is a clamping element with two clamping or spring legs 77 and 78. They have a somewhat smaller thickness than the vertical leg 74 and have a part-circular (rounded) transition at the origin of the clamping element. The leg 78 extends in the downward direction at a slant toward the leg 77 and has an outwardly extending end 79 positioned at an oblique angle to the main body of the leg 78. The lower end 80 of the holder 8' is embodied identically. The shoulder 7 of the holder 8 projects through the lateral opening or slot 60 of the receiving member 56 and rests on the lower wall section 58. The upwardly projecting free end 72 of the shoulder 7 engages behind the upper wall section 81 of the side wall 58. The other holder 8' has a horizonal shoulder 7' that projects through the lateral opening or slot 61 of the receiving member 57 and rests at the lower wall section 59. The downwardly angled free end 73 of the shoulder 7' engages behind the lower wall section 59. Thus, both holders 8 and 8' are secured reliably at the rail, respectively, at its receiving members 56 and 57. The holders 8, 8' can be displaced along the receiving members 56, 57 as desired into a selected mounting position. The free ends 72, 73 of the shoulders 7, 7' have such a length that they cannot be pulled from the slots 60, 61 transverse to the longitudinal direction of the receiving members 56, 57.

The hollow space or chamber delimited between the oppositely arranged filter frames 4, 4' is closed off in the downward direction by a closure plate 82. It is comprised substantially of a bottom plate 83 which has upwardly projecting spaced apart securing projections 84 and 85 with widening free ends 86 and 87. In the mounted position the closure plate 82 is supported with its edges 88, 89 projecting laterally past the projections 84, 85 on the L-shaped legs 63 and 90 of the filter frames 4, 4'. The widened ends 86 and 87 of the projections 84, 85 are secured in the clamping elements 76, 80 of the holder 8, 8'. The inner side 91 of the bottom plate 83 has a tooth-shaped profile in a direction transverse to the longitudinal direction. The cover plate 82 is preferably comprised of plastic. The spring legs 77, 78; 92, 93 of the clamping member 76, 80 of the holders 8, 8' are spring-elastic and receive under prestress the widened ends 86, 87 of the projections 84, 85. The spring legs 77, 93 of the clamping elements 76, 80 facing the filter 3, 3' have a planar inner side at which the projections 84, 85 rest with surface contact. Due to the angled free ends 79, 94 of the legs 78, 92 of the clamping elements 76, 80 the projections 84, 85 can be easily inserted into the elements 76, 80 especially since the widened ends 86, 87 of the projections have a part-circular cross-section.

Figure 2:
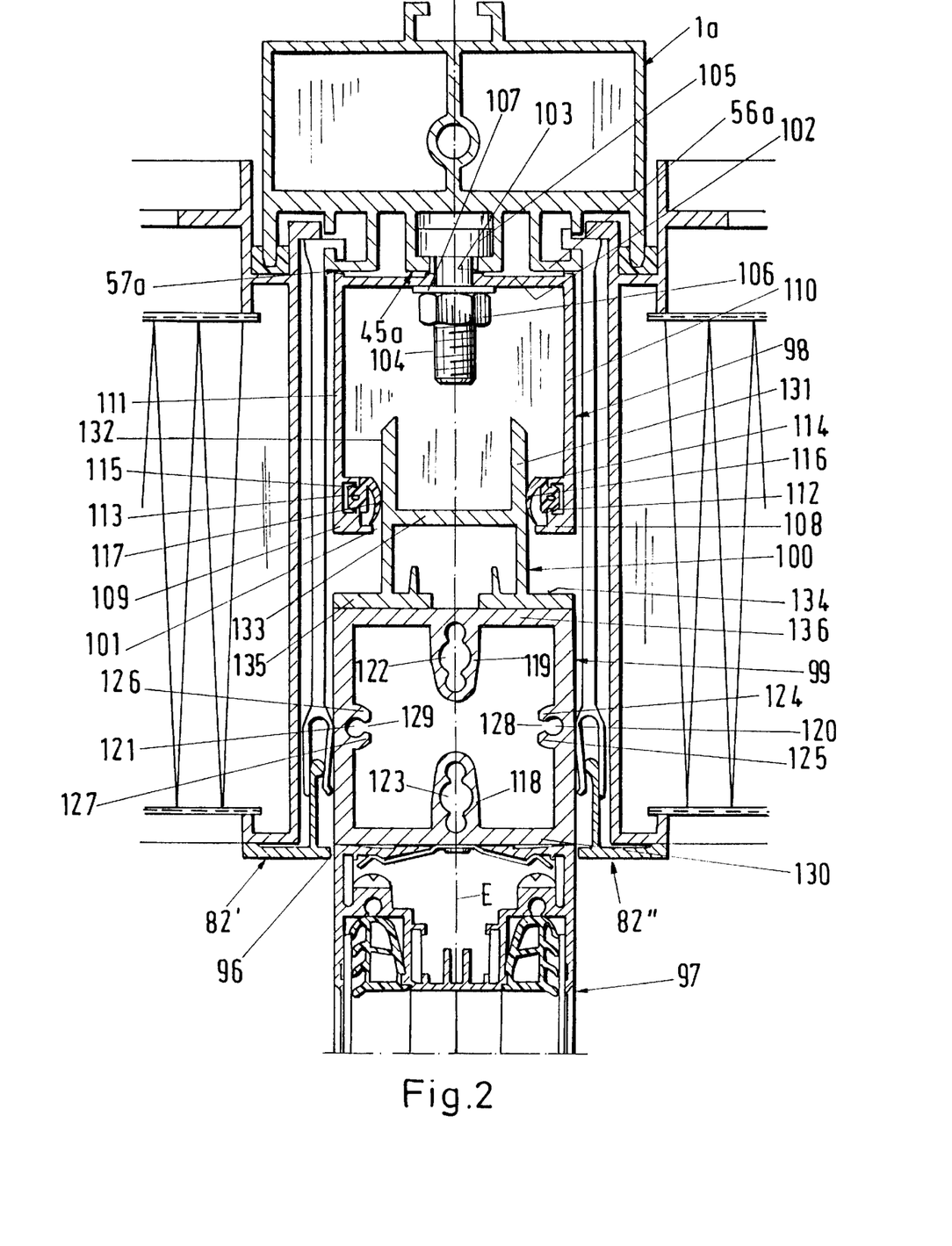
FIG. 2 shows a vertical section of the clean room ceiling structure according to FIG. 1 with a vertical wall.

The embodiment according to FIG. 2 differs from the aforedescribed embodiment substantially only in that the closure plate is comprised of two parts 82', 82" between which a through opening 96 for a wall member 97 projecting downwardly past the filter unit is provided. It is connected by multi-part fastening elements 98, 99 to the rail 1a. The fastening elements include a profiled member 98, which in cross-section is substantially U-shaped and extends in the longitudinal direction, and a profiled member 99 that in cross-section is substantially square and projects with a projection 100 into a slot 101 of the upper profiled member 98. The profiled member 98 is positioned with its end face 102 at the receiving members 56a and 57a of the rail 1a and comprises at least one, preferably more, openings 103 that in the longitudinal direction are spaced from one another and are centrally arranged. Securing and holding parts 104 extend through these openings. The securing part 104 is preferably a screw having a head 105 in the centrally arranged receiving member 45a of the rail 1a. The screw 104 is secured by a nut 106 and an interposed washer 107 at the end face 102. The free ends 108 and 109 of the legs 110 and 111 of the profiled member 98 are widened and provided with receiving members 112 and 113 in which a respective seal 114, and 115 is arranged. The seals 114, 115 have a spring leg 116, 117 which, when the wall member 97 and the profiled part 99 are mounted, is sealing supported at the projection 100 with elastic prestress.

The profiled member 99 is a tubular part of a square cross-section and has receiving elements 118, 119, 120, 121 for securing parts. The opposed receiving elements 118 and 119 in cross-section are bracket-shaped with keyhole openings 122, 123. Both receiving openings 118 and 119 are of identical design. The opposed lateral receiving elements 120 and 121 are also of identical design. They are mirror-symmetrically positioned relative to the vertical plane E of the wall member 97. They have part-circular clamping legs 124, 125 and 126, 127 which delimit insertion slots 128, 129. In these receiving elements connecting rods etc., can be secured. The wall member 97 is fastened to a lower wall 130 of the profiled member 99.

The projection 100, preferably a separate profiled member, is provided on the profiled part 99 and is preferably screwed thereto. The projection 100 in cross-section is approximately H-shaped and has legs 131, 132 which in the mounted position extend parallel to the vertical plane E and are connected by a transverse stay 133. The legs 131, 132 project perpendicularly from the plate-shaped bottom portion 134, 135 which rest with surface contact on the upper wall 136 of the profiled member 99 and are screwed thereto. The bottom parts 134, 135 project transverse to the vertical plane E laterally past both sides of the legs 131, 132.

Figure 3:
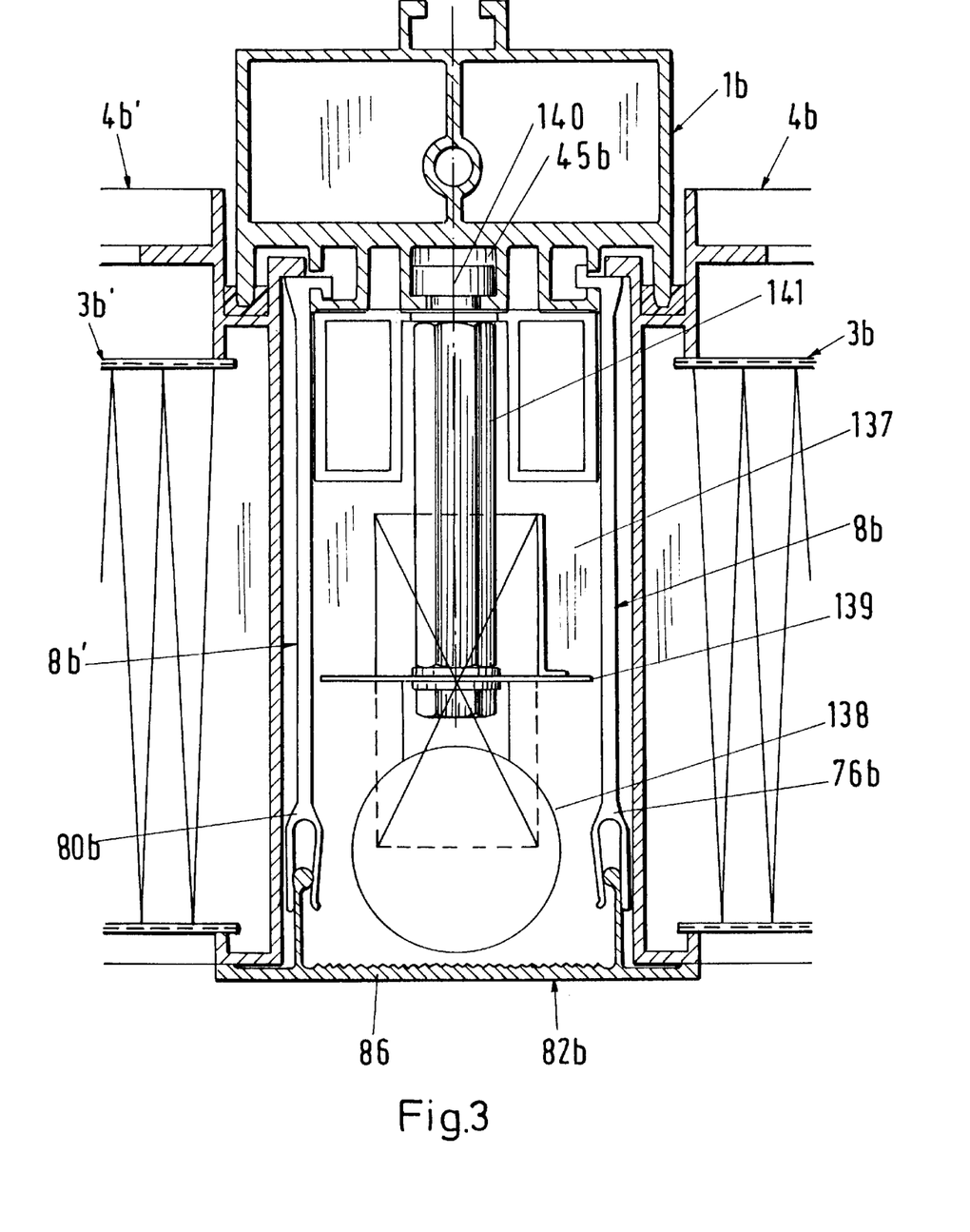
FIG. 3 shows in a representation corresponding to FIG. 1 the ceiling structure according to FIG. 1 with a lamp.

In the embodiment according to FIG. 3, the rail 1b is of the same construction as the rail 1a. Furthermore, the filters 3b and 3b', the filter frames 4b, 4b', and the holders 8b, 8b' are of the same construction as the corresponding parts of FIGS. 1 and 2. The closure plate 82b is of identical construction as the closure part 82 of FIG. 1. In the area between the holders 8b and 8b' a channel or chamber 137 is formed in which a lamp is arranged. The lamp 138 is positioned at the level of the receiving elements 76b and 80b and extends downwardly into the vicinity of the closure plate 82b. The lamp 138 is preferably screwed to the rail 1b, whereby the lamp is fastened to a support 139, preferably by screws. Head 140 of the holding member 141 is positioned in the central receiving member 45b of the rail 1b. The holding member 141 projects downwardly from the receiving member 45b into the chamber 137 and is fastened to the support 139.

Since the lamp 138 is positioned within the cross-sectional width of the rail 1b and within the range of the thickness of the filter 3b, 3b', the modular design of the modular ceiling is not negatively impacted and the usable height of the room is not reduced.

Figure 4:
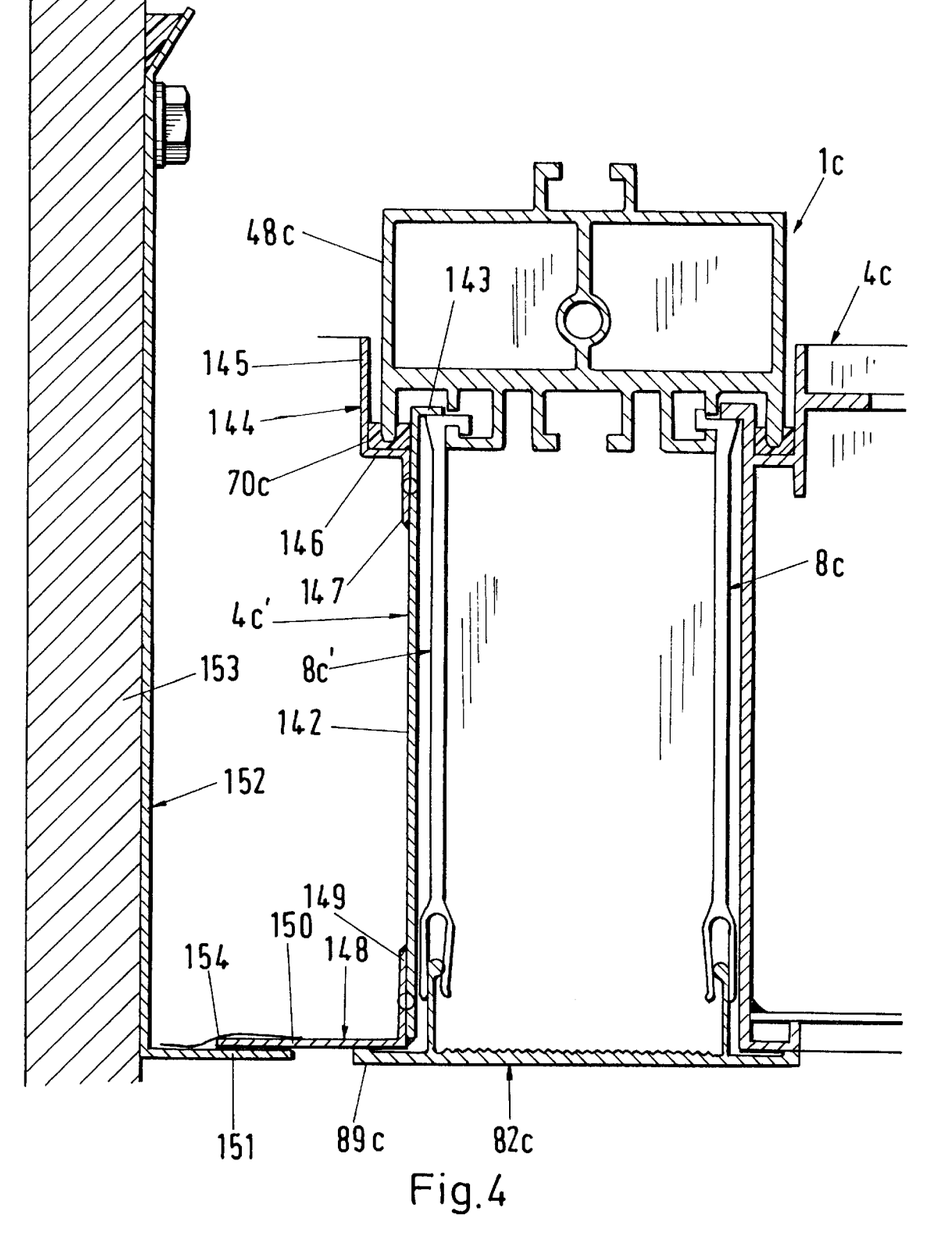
FIG. 4 shows in a representation according to FIG. 1 the clean room ceiling structure according to FIG. 1 with a false frame element and a sheet metal element.

In the embodiment according to FIG. 4, the rail 1c and the holder 8c, 8c' are of the same construction as the rail 1 and the holders 8, 8' of FIG. 1. Instead of the filter 3 with filter frame 4 a false filter unit is provided which is comprised only of the filter frame 4c. It is of identical construction as the filter frame 4 of FIG. 1. Instead of the filter 3' and of the filter frame 4' (FIG. 1) a false frame element 4c' is provided. It comprises a vertical wall section 142 with an upper edge 143 that is bent at a right angle toward the filter frame 4c which preferably has the same thickness as the wall section 142. In the area below the fluid groove 70c a Z-shaped profiled member 144 is fastened to the wall section 142, preferably by welding. Member 144 comprises a longer leg 145 positioned at a small distance to the side wall 48c of the rail 1c and connected by a transverse stay 146 to the shorter leg 147. The two parallel legs 145, 147 are positioned vertically when mounted. The leg 147 rests at the wall 142 facing away from the holder 8c. The horizontal transverse stay 146 forms the bottom of the fluid groove 70c.

At the lower edge of the wall section 142 a rail member 148 having an L-shaped cross-section with short vertical leg 149 is attached, preferably by welding. The longer leg 150 rests on the neighboring projecting edge 89c of the closure plate 82c. The leg 150 overlaps a horizontal leg 151 of a connecting part 152 having an L-shaped cross-section. The connecting part 152 is preferably screwed to a vertical wall 153. For sealing the leg 151 and the leg 150 relative to one another, a sealing band 154 is connected to leg 150.

Figure 5:
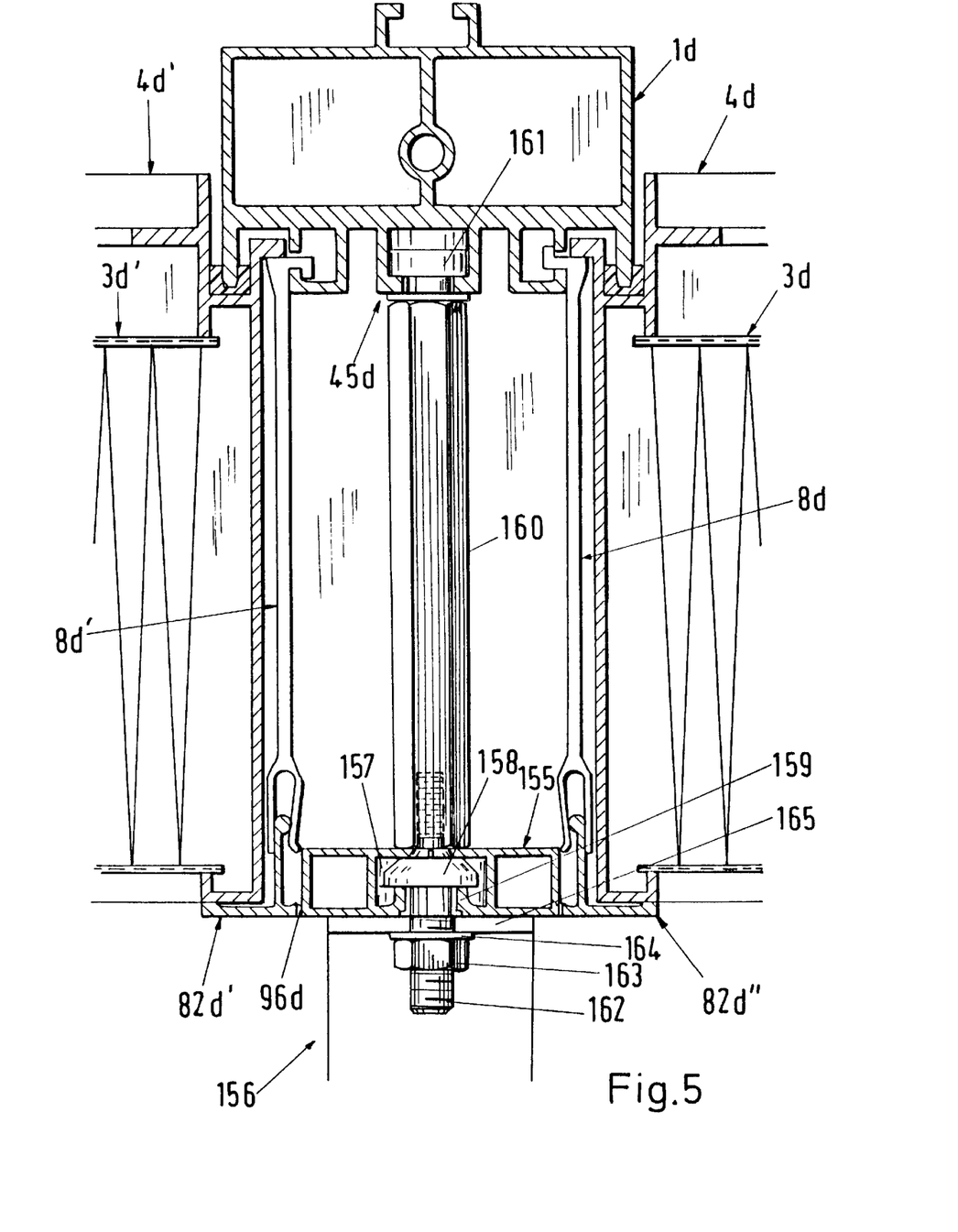
FIG. 5 shows in vertical section the clean room ceiling structure according to FIG. 1 with a suspended load.

In the embodiment according to FIG. 5, the rail 1d, the filter units 3d, 4d, 3d', 4d', the holders 8d, 8d', and the closure plate 82d', 82d" correspond to the respective parts of FIG. 2. A profiled support member 155 is fastened in the opening 96d between the closure parts 82d', 82" instead of the vertical wall member 97 shown in FIG. 2. At the underside of the profiled support member 155 a suspended load 156 is provided which may be, for example, a transport system. The support member 155 has a central receiving chamber 157 for the head 158 which is supported at the annular wall 159 within the receiving chamber 157. The head 158 is part of a threaded bolt 160 which projects upwardly past the profiled support member 155 and is positioned with its bolt head 161 in the central receiving member 45d of the rail 1d. The threaded bolt 160 is positioned centrally between the holders 8d, 8d' and projects with its threaded part 162 in the downward direction from the profiled support member 155. A nut 163 is threaded onto the threaded end 162 and rests with a washer 164 at the end face 165 of the suspended load 156. The suspended load 156 is clamped by the nut 163 against the profiled support member 155 and the threaded bolt 160 is pressed against the rail 1d. The profiled support member 155 rests with its underside flush at the underside of the closure late 82d', 82d" and is positioned within the cross-sectional width of the rail 1d.

Figure 12:
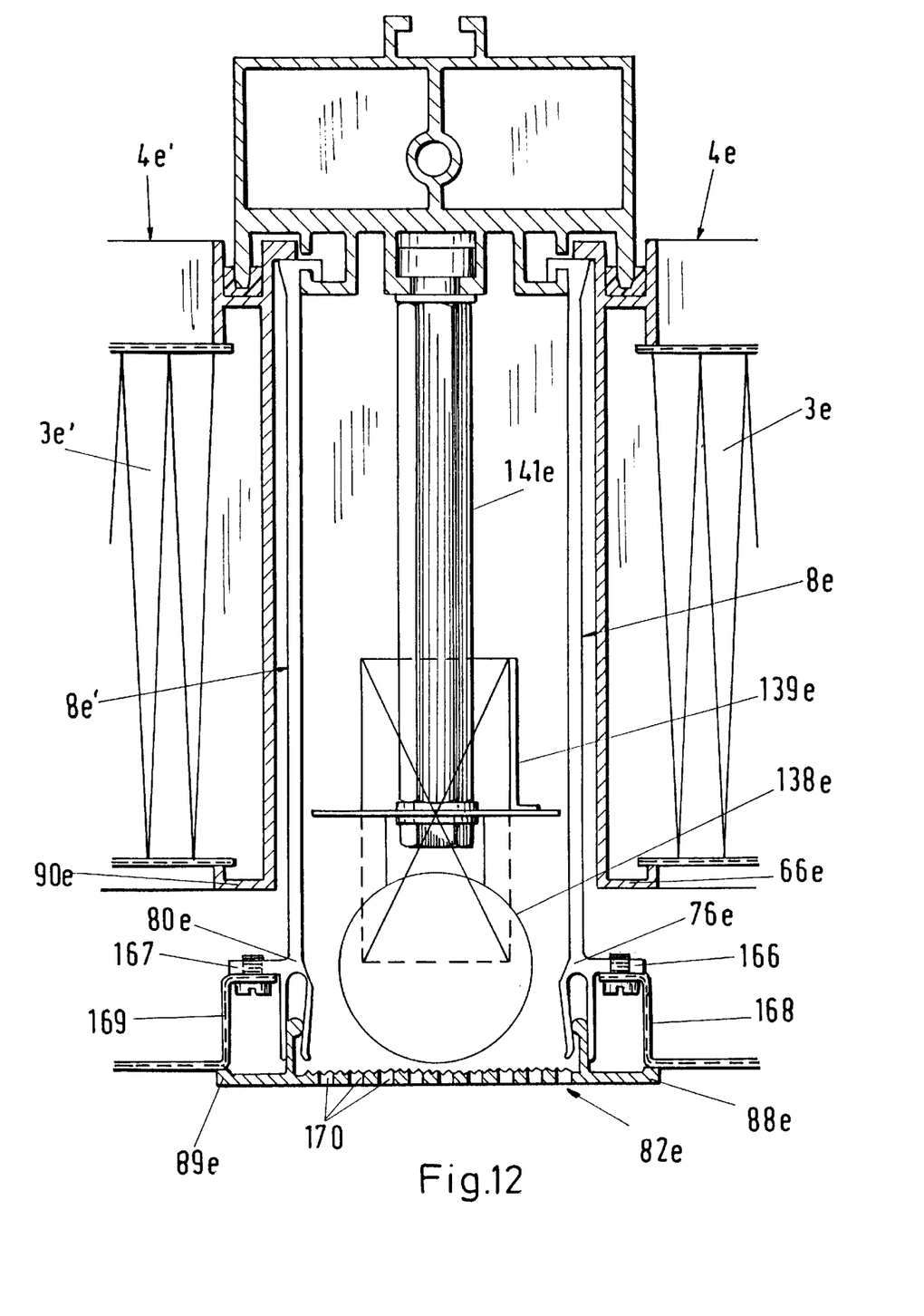
FIGS. 12–13 show in representations according to FIG. 1 two further embodiments of the inventive clean room ceiling structure.

The embodiment according to FIG. 12 corresponds substantially to the embodiment according to FIG. 3. The holders 8e, 8e' project downwardly so that the clamping member elements 76e, 80e are positioned in the area below the filter frame 4e, 4e'. The holding member 141e to which the support 139e is fastened is elongated accordingly so that the lamp 138e is positioned at a small distance above the closure plate 82e. The lamp 138e is positioned almost completely in the area below the filter frame 4e, 4e'. The clamping elements 76e, 80e are provided at their sides facing away from one another with an outwardly projecting stay 166, 167. The stays 166, 167 are positioned parallel to horizontal legs 66e, 90e at the lower edge of the filter frame 4e, 4e'. The stays 166, 167 are arranged at a distance below the legs 66e, 90e. At the underside of the stays 166, 167 a respective perforated sheet metal plate 168, 169 is fastened. The sheet metal plates 168, 169 extend from the stays 166, 167 vertically downwardly and are then horizontally angled. At the transition from the vertical to the horizontal portion of the perforated sheet metal plates 168, 169, the closure plate 82e rests with its edges 88e, 89e. The closure plate 82e is provided with air vent openings 170.

The clean air flowing through the filters 3e, 3e' in the downward direction impinges on the perforated sheet metal plates 168,169 and enters the clean room therethrough. The perforated sheet metal plates 168, 169 cause a minimal reduction in air flow so that the clean air is directed toward the closure plate 82e and can also flow through its openings 170 into the clean room. In this manner, the flow of clean air takes place also in the area of the closure plates 82, i.e., over the entire surface area of the modular ceiling structure. Additionally, the lamp 138e can be partly cooled by the air flowing in the direction toward the closure plate 82e. Otherwise, this embodiment is identical to the embodiment of FIG. 3.

Figure 13:
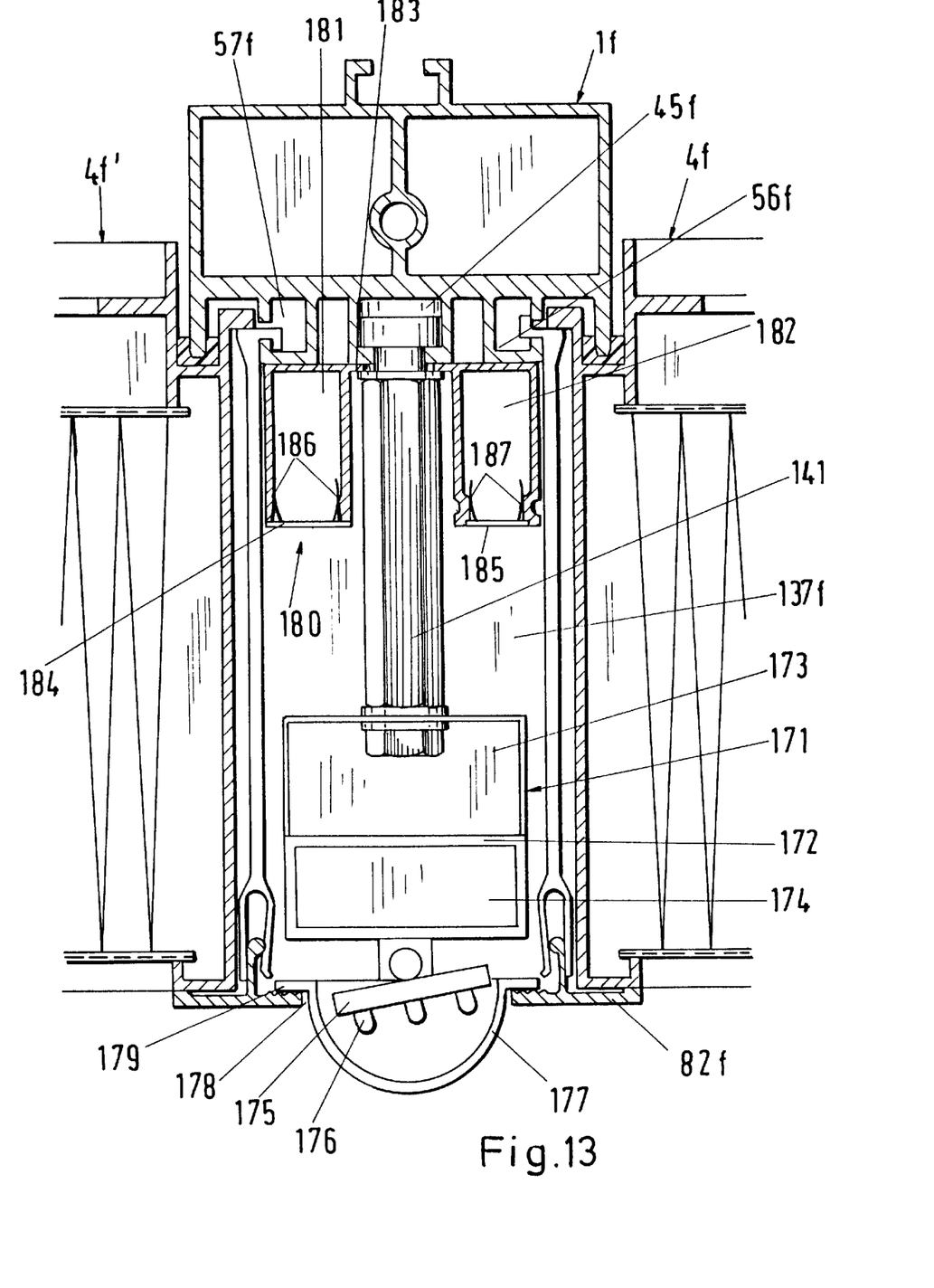

FIG. 13 shows an embodiment in which a profiled member 171 is positioned within the channel or chamber 137f between the two filter frames 4f, 4f'. It has a rectangular cross-section and is divided by a horizontal wall 172 into two compartments 173 and 174. The profiled member 171, as described with the aid of FIG. 3 for the lamp 138, is fastened to the holder 141 within the chamber 137f. In the profiled member 171 a non-represented sending-and-receiving unit (electronic device) is provided.

At the underside of the profiled member 171, a support 175 is advantageously pivotably supported which comprises at least one sending/receiving diode 176. The support 175 is positioned below a cover 177 that is translucent for the sending signals. Advantageously, it is of a semi-spherical shape and projects through an opening 178 into the closure plate 82f. The cover 177 has a circumferential flange 179 with which the cover 177 is secured at the backside of the closure plate 82f. The diodes 176 are advantageously IR diodes connected to the sending/receiving electronic device provided within the profiled member 171. With the aid of the sending/receiving unit, devices positioned within the clean room can be remote-controlled and/or can be supplied with data. It is also possible to send signals from the devices and apparatus within the clean room to the sending/receiving unit.

At the bottom side of the receiving members 45f, 56f, 57f of the rail 1f a hollow profiled member 180 is fastened by holding member 141 within the chamber 137f. It is positioned at the rail 1f and has two compartments 181, 182 spaced at a distance from one another which are positioned on opposite sides of the holding members 141 and have a rectangular cross-section. Between the two compartments 181, 182 a stay 183 extends along the underside of the rail 1f and is penetrated by the holding member 141. The two compartments 181, 182 are identical and can receive data and/or supply cables. The sending-and-receiving unit can be connected via cables positioned within the compartments 181, 182 to a computer, a control unit etc.

The compartments 181, 182 open downwardly and are closed off by a cover plate 184, 185. They have spaced apart clamping springs 186, 187 projecting into the compartments 181, 182 and secure the cover plates 184, 185. For generating the required clamping tension, the side walls of the compartments 181, 182 are of a thicker construction at the lower end and are provided with inwardly projecting profiles so that the clamping springs 186, 187 upon insertion can be elastically inwardly deformed.

In other respects the embodiment according to FIG. 13 is identical to the embodiment according to FIG. 3 in which the profiled member 180 is also provided. The profiled member 180 can also be provided in the embodiments according to FIGS. 1, 4, 5, and 12.

In the disclosed embodiments the fluid groove 70, 71, 70c is a component of the filter frame 4, 4', 4c' so that the fluid groove in the mounted position of the filter unit is located within the contour of the frame. Thus, the support structure comprised of the rails and the coupling members must not be widened for providing the fluid groove so that the effective filter surface area is not reduced. Instead, the effective filter surface area can even be enlarged. It is furthermore advantageous that despite the enlargement of the filter surface area the underside of the ceiling construction is planar. Furthermore, the disclosed embodiments have the advantage that auxiliary parts such as lamps, suspended loads, wall fixation elements etc., can be positioned between the filters 3, 3' so that they must not be positioned within a hollow space of the frame profile.

The present invention is, of course, in no way restricted to the specific disclosure of the specification and drawings, but also encompasses any modifications within the scope of the appended claims.

What is claimed is:

1. A clean room ceiling structure comprising:

a support structure;

filter units comprising a filter frame and a filter secured is said filter frame;

said filter frames connected to said support structure;

said filter units comprising at least one fluid groove for sealing said filter units relative to said support structure;

wherein said support structure has at least one sealing stay extending into said at least one fluid groove;

wherein said support structure comprises holders and rails, wherein said rails have outer receiving members at an underside of said rails and wherein said holders are attached to said outer receiving members;

wherein said sealing stays are connected to said rails and are positioned adjacent to said outer receiving members, wherein said outer receiving members have a lateral opening;

wherein said lateral opening of said outer receiving members opens toward said sealing stays and wherein said holders have a securing stay inserted into said lateral opening.

2. A clean room ceiling structure according to claim 1, wherein said at least one fluid groove is provided at said filter frame.

3. A clean room ceiling structure according to claim 1, wherein said filter frame has a stay on a side facing away from said filter for securing said filter unit at said support structure.

4. A clean room ceiling structure according to claim 2, wherein said fluid groove is positioned on a side of said filter frame facing said filter.

5. A clean room ceiling structure comprising:
a support structure;
filter units comprising a filter frame and a filter secured in said filter frame;
said filter frames connected to said support structure;
said filter units comprising at least one fluid groove for sealing said filter units relative to said support structure;
wherein said support structure has aet least one sealing stay extending into said at least one fluid groove;
wherein said support structure comprises holders and rails, wherein said rails have outer receiving members at an underside of said rails and wherein said holders are attached to said outer receiving members;
wherein said rails have a central receiving member arranged between said outer receiving members and having a downwardly open insertion slot.

6. A clean room ceiling structure according to claim 1, wherein said rails are hollow members having a rectangular cross-section and wherein said outer and central receiving members are connected to a bottom of said hollow members.

7. A clean room ceiling structure according to claim 6, wherein said hollow member has a top wall opposite said bottom and includes an upper receiving member connected to said top wall so as to be mirror-symmetrically arranged relative to a longitudinal center plane of said hollow member.

8. A clean room ceiling structure according to claim 1, wherein said filter frame comprises a receiving opening for said filter.

9. A clean room ceiling structure comprising:
a support structure;
filter units comprising filter frame and a filter secured in said filter frame;
said filter frames connected to said support structure;
said filter units comprising at least one fluid groove for sealing said filter units relative to said support structure;
wherein said support structure has at least on sealing stay extending into said at least one fluid groove;
wherein said support structure comprises holders and rails, wherein said rails have outer receiving members at an underside of said rails and wherein said holders are attached to said outer receiving members;
wherein said filter frame has a stay on a side facing away from said filter and wherein said stay rests on said holders.

10. A clean room ceiling structure according to claim 1, wherein said outer receiving members have a wall section adjacent to said lateral opening and wherein said securing stay engages behind said wall section.

11. A clean room ceiling structure according to claim 1, wherein said holders have a clamping element remote from said securing stay, said clamping element having spring legs.

12. A clean room ceiling structure according to claim 11, further comprising at least one closure plate positioned between facing sides of said filter frames.

13. A clean room ceiling structure according to claim 12, wherein said closure plate has securing projections with widened ends that are inserted into said clamping elements for attaching said closure plate to said holders.

14. A clean room ceiling structure according to claim 12, wherein said closure plate is comprised of two parts, wherein between adjacent ones of said filter frames a wall member is positioned, and wherein said two parts, abut said wall member.

15. A clean room ceiling structure according to claim 14, wherein said wall member has fastening elements in the from of hollow members connected to one another and wherein said wall member is connected by said fastening elements to one of said rails.

16. A clean room ceiling structure according to claim 15, wherein a first one of said fastening elements is directly fastened to said rail.

17. A clean room ceiling structure according to claim 16, wherein a second one of said fastening elements comprises a snap-on fastener for connecting said second fastening element to said first fastening element.

18. A clean room ceiling structure according to claim 12, further comprising a lamp, wherein adjacent ones of said holders and said closure plate define a chamber and wherein said lamp is positioned in said chamber.

19. A clean room ceiling structure according to claim 18, wherein said lamp is connected to said rail.

20. A clean room ceiling structure comprising:
a support structure;
filter units comprising a filter frame and a filter secured in said filter frame;
said filter frames connected to said support structure;
said filter units comprising at least one fluid groove for sealing said filter units relative to said support structure;
wherein one of said filter frames is a false frame element;
wherein said false frame element comprises a wall section and a Z-shaped member forming one of said fluid grooves, wherein said Z-shaped member is connected to said wall section by welding.

21. A clean room ceiling structure according to claim 20, wherein said false frame element further comprises a rail member connected to said wall section by welding, wherein said closure plate has an edge resting at said rail member.

22. A clean room ceiling structure according to claim 12, further comprising a support member for carrying a load, wherein said closure plate is comprised of two parts resting at opposed sides of said support member.

23. A clean room ceiling structure according to claim 22, wherein said load is screwed to said support member.

24. A clean room ceiling structure according to claim 22, wherein said support member is fastened to said rail by screwing.

25. A clean room ceiling structure according to claim 1, wherein said fluid groove is positioned inside a cross-sectional width of said filter frame.

26. A clean room ceiling structure according to claim 12, wherein said closure plate is positioned below said filter frame.

27. A clean room ceiling structure according to claim 22, wherein said support structure has at least one sealing stay extending into said at least one fluid groove.

28. A clean room ceiling structure according to claim 27, wherein said support structure comprises holders and rails, wherein said rails have outer receiving members at an underside of said rails and wherein said holders are attached to said outer receiving members.

29. A clean room ceiling structure according to claim 28, wherein said sealing stays are connected to said rails and are positioned adjacent to said outer receiving members, wherein said outer receiving members have a lateral opening.

30. A clean room ceiling structure according to claim 29, wherein said holders are suspended from said outer receiving members.

31. A clean room ceiling structure according to claim 26, wherein said closure plate has air vent openings.

32. A clean room ceiling structure according to claim 31, wherein said closure plate is attached to said holders.

33. A clean room ceiling structure according to claim 26, further comprising perforated plates connected at a spacing underneath said filter units, wherein said closure plate is positioned adjacent to said perforated plates.

34. A clean room ceiling structure according to claim 12, further comprising at least one sending-and-receiving unit positioned in a space between adjacent ones of said filter frames.

35. A clean room ceiling structure according to claim 34, wherein said sending-and-receiving unit comprises at least one sending/receiving diode and/or a radio wave transmitting device.

36. A clean room ceiling structure according to claim 35, wherein said diode is an IR diode.

37. A clean room ceiling structure according to claim 35, further comprising a signal-translucent cover for covering said diode.

38. A clean room ceiling structure according to claim 36, wherein said cover is connected to said closure plate.

39. A clean room ceiling structure according to claim 12, further comprising at least one profiled member positioned in a space between two adjacent ones of said filter frames.

40. A clean room ceiling structure according to claim 39, further comprising a sending-and-receiving unit received in one of said at least one profiled members.

41. A clean room ceiling structure according to claim 40, further comprising data and/or supply cables received in another one of said at least one profiled members.

42. A clean room ceiling structure according to claim 1, wherein said holders are suspended from said outer receiving members.

* * * * *